United States Patent [19]

Halberschmidt et al.

[11] 4,171,657
[45] Oct. 23, 1979

[54] NUMERICALLY-CONTROLLED FORM-CUTTING MACHINE

[75] Inventors: Friedrich Halberschmidt, Herzogenrath; Heinz-Josef Reinmold, Aachen; Josef Audi, Aachen; Horst Mucha, Aachen; Wilhelm Arnoldi, Aachen; Kurt Fattler, Aachen; Albrecht Overath, D-Wurselen, all of Fed. Rep. of Germany

[73] Assignee: Saint-Gobain Industries, France

[21] Appl. No.: 841,336

[22] Filed: Oct. 12, 1977

[30] Foreign Application Priority Data

Oct. 13, 1976 [DE] Fed. Rep. of Germany ....... 2646062

[51] Int. Cl.$^2$ .............................................. C03B 33/04
[52] U.S. Cl. ......................................... 83/886; 83/71; 83/925 CC; 33/1 M
[58] Field of Search .................... 83/6, 7, 8, 11, 12, 83/71, 925 CC, 886, 887; 33/1 M, 27 R; 112/121.11, 121.12; 74/229

[56] References Cited

U.S. PATENT DOCUMENTS

| 3,522,753 | 8/1970 | Schmied | 83/71 X |
| 3,672,415 | 6/1972 | Holan | 144/136 R |
| 3,715,945 | 2/1973 | Mochizuki et al. | 83/71 X |
| 3,772,949 | 11/1973 | Pavone | 83/925 CC |
| 3,810,414 | 5/1974 | Gerber | 33/1 M |
| 3,817,140 | 6/1974 | Neil | 83/635 |

OTHER PUBLICATIONS

Hudson, V. L., *Paper Feed Attachments on Timing Belts*, I.B.M. Technical Disclosure Bulletin, vol. 1, No. 4, Dec. 1958.

*Primary Examiner*—J. M. Meister
*Attorney, Agent, or Firm*—Pennie & Edmonds

[57] ABSTRACT

A form-cutting machine is disclosed for cutting a form in a flat surface of a sheet of material such as glass in response to a numerical control signal, the shape of the form being determined by the numerical control signal. The form-cutting machine comprises a frame, sheet-support means for supporting the sheet of material to be cut, an X-direction carriage-positioning assembly, a Y-direction carriage-positioning assembly, and a tool carriage having a cutting tool mounted on it so that the cutting tool can be positioned in a plane in which the cut is to be made. Each carriage-positioning assembly includes a carriage support member which extends generally perpendicular to a direction of motion, two guide members fixed to the frame which are spaced apart from one another and extend generally parallel to the direction of motion, and two sliders connected to ends of the carriage support member and slideably mounted on the two guide members. Each carriage-positioning assembly also includes a drive motor fixedly secured to the frame for moving the carriage-support member and toothed-belt means for connecting the drive motor and the carriage support member so that motion produced by a motor is imparted to the support member with substantially no slippage. The tool carriage is slideably mounted on the two substantially perpendicular carriage-support members, so that moving the carriage support members causes the cutting tool to move in a plane. The form-cutting machine further comprises circuit means connected to the drive motors so that the carriage support members and, consequently the tool carriage, are positioned in response to the numerical control signal.

10 Claims, 8 Drawing Figures

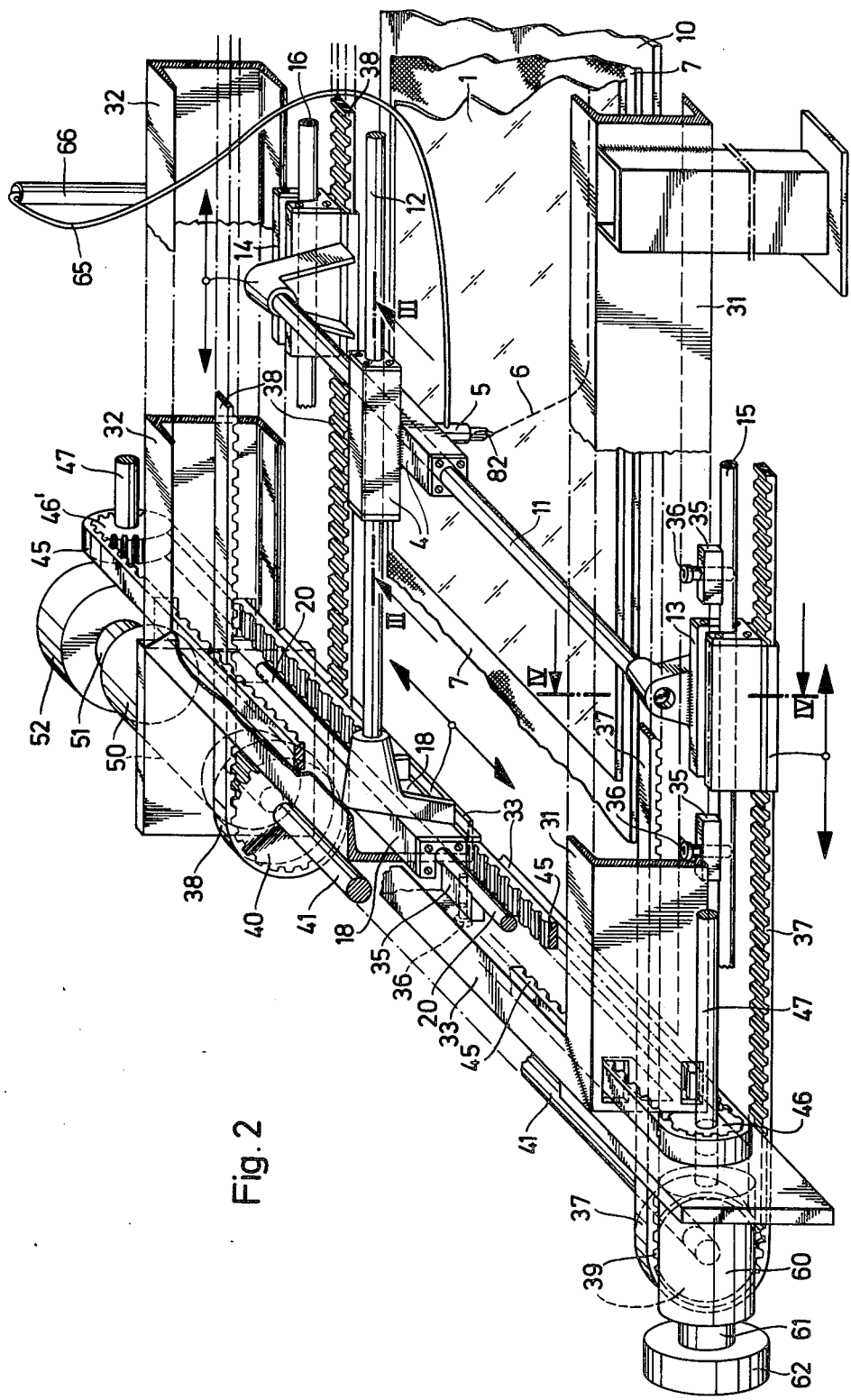

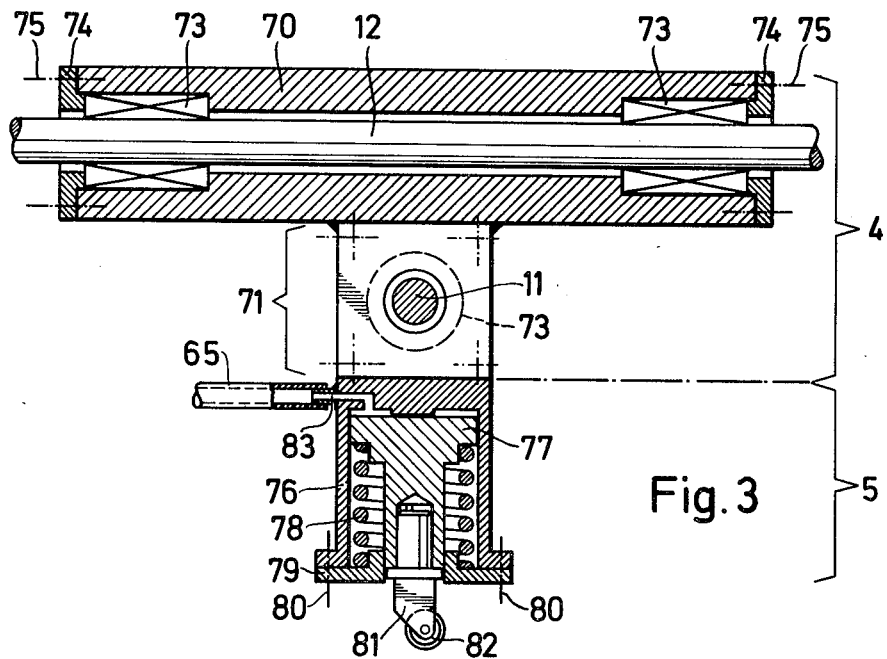
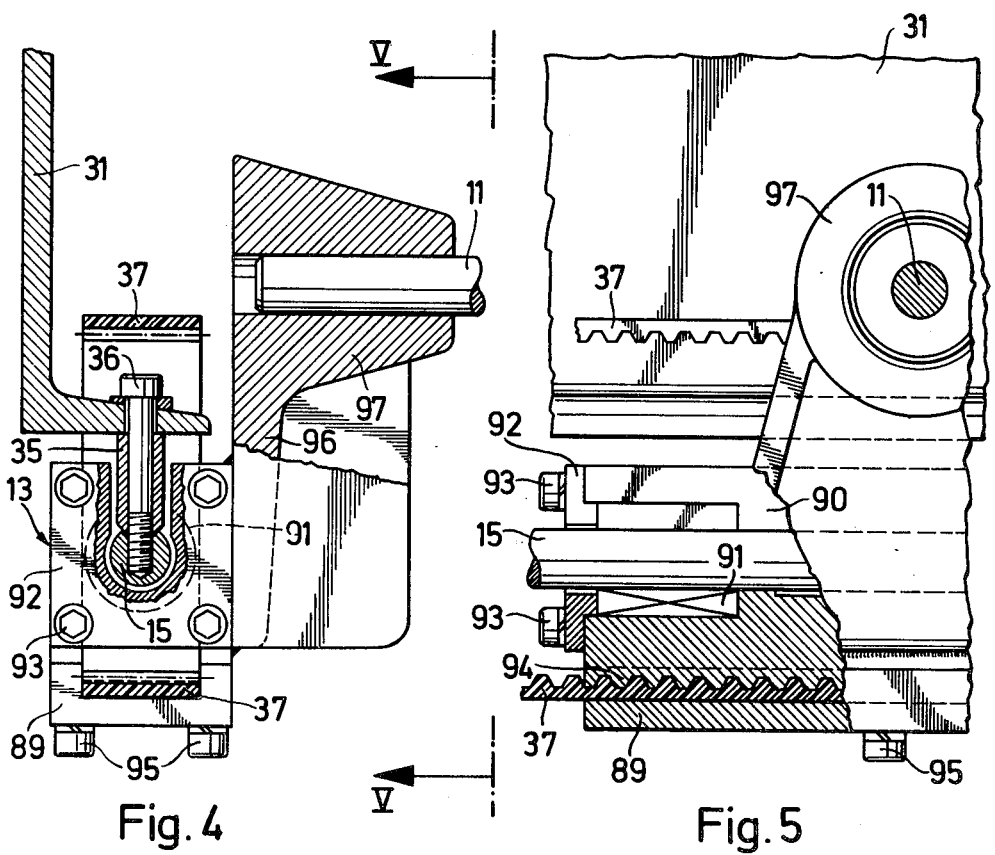

NUMERICALLY-CONTROLLED FORM-CUTTING MACHINE

BACKGROUND OF THE INVENTION

A. Field of the Invention

This invention relates to a high-speed, numerically-controlled cutting machine particularly useful for cutting glass sheets.

B. Description of the Prior Art

Various cutting machines for sheets of materials are known in which the movement of a cutting tool is numerically controlled. However, known machines of this type have a tracing velocity of less than about 10 m/min. As a result it is not possible when using such machines in the cutting of glass sheets to obtain clean and flawless edges, since, as is known, sharp and regular edges can only be obtained in silicate glass for tracing velocities in excess of about 30 m/min and preferably greater than 50 m/min. Furthermore, the efficiency of known numerically-controlled automatic cutting devices is relatively low, substantially less than the efficiency of automatic machines controlled by a template.

Because of the above-mentioned drawbacks in present numerically-controlled cutting machines for glass sheets, machines controlled by a template are generally used for high-speed glass cutting. While such template-controlled machines are suitable for cutting sets of many units of the same pattern, the idle time required to change the templates and adjust the machine to the new pattern is a serious drawback, particularly when producing smaller sets. For smaller sets of different patterns, numerically-controlled automatic machines would be best suited were it not for the above-mentioned drawbacks.

SUMMARY OF THE INVENTION

The object of the present invention is to provide an automatic, numerically-controlled cutting machine which can trace a cutting line at a velocity greater than about 30 m/min and which nonetheless complies with the strict requirements imposed on cutting machines for glass sheets as far as the precision of the tracing, reproducibility of the pattern, reliability and sturdiness are concerned. In preferred embodiments of the present invention, deviations of the tracing from a desired theoretical curve do not exceed about ± 0.1 mm.

In preferred embodiments of the present invention this ambitious objective is achieved in part as a result of a mechanical design of the apparatus which, according to the invention, includes a cross-shaped, tool-holding carriage which moves on two perpendicular guides which respectively extend substantially parallel to two mutually perpendicular coordinate axes X and Y. The two guides are located in two substantially parallel planes spaced apart from each other and from a surface of the sheet to be cut. The two guides are joined to a frame of the apparatus by sliders. The apparatus further includes motors providing for the displacement of the two guides. The motors are mounted in a fixed position on the frame. The apparatus also includes toothed belts for transferring motion substantially without slippage from the motors to the guides.

Because of the combination of these characteristics of the invention, masses which must be moved can be reduced to a minimum so that acceleration and deceleration forces are small and the machine can run, due to its operation substantially without slippage, at speeds higher than heretofore attainable with such numerically-controlled cutting machines. In particular, the transmission of forces through toothed belts contributes to these results. It has been established that one embodiment of the present invention can run with a tracing velocity of up to about 80 m//min with a tolerance of plus or minus about 0.1 mm on the projected cutting contour. Thus it is now possible to attain the efficiency of template-controlled cutting machines with a numerically-controlled machine.

According to one preferred embodiment of the invention, the perpendicular guides comprise shafts on which the cross-shaped carriage supporting a tracing tool is mounted by ball-bearing slides. These features provide an additional decrease in the masses to be moved as well as a simplification in construction.

In form-cutting machines for glass sheets, it is conventional to vary the tracing velocity as a function of the radius of curvature of the cutting line. Thus, rectilinear portions are generally traced at a greater velocity than sharply curving portions. Such variations in the tracing velocity can be obtained readily, if desired, in the new machines according to the present invention. changed.

Furthermore, in a preferred embodiment of the invention a generally uniformly sharp cut is obtained even along lengths in which the tracing is effected at a greater velocity than other lengths by adjusting the pressure of the tool on the glass surface. To vary the pressure of the tracing tool, the number of impulses per unit time controlling the motion of the cutting-tool holding carriage is charged.

Control of the carriage driving motors can be effected, for example, by using a transistor circuit or a thyristor circuit operating according to the priming and phase shifting technique. It is also possible to use an electrohydraulic control of the carriage.

BRIEF DESCRIPTION OF THE DRAWINGS

The appended drawings illustrate a preferred embodiment of a machine according to the present invention, as well as various drive motor control systems.

FIG. 2 shows a perspective view of the structure of a cutting machine with the main guiding and driving members;

FIG. 3 shows a vertical section along line III—III of FIG. 2 through the cross-shaped carriage and through the cross-shaped carriage and through the tracing tool;

FIG. 4 is a vertical cross-sectional view along line IV—IV of FIG. 2;

FIG. 5 is a view of the members shown in FIG. 4 looking in the direction of arrows V—V;

DETAILED DESCRIPTION OF PREFERRED EMBODIMENTS

Figure 1:
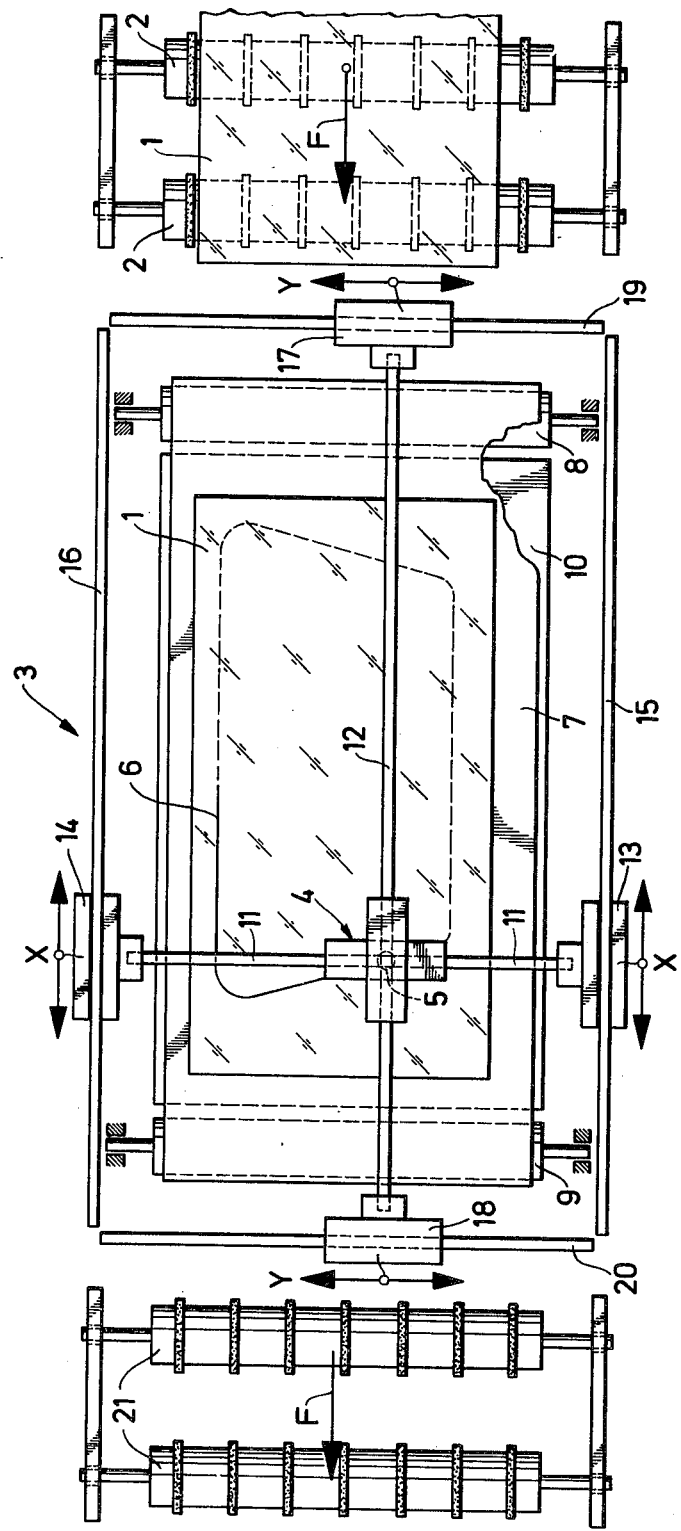
FIG. 1 is a diagrammatic view of a form cutting machine incorporated in a glass-sheet conveyance line.

FIG. 1 shows diagrammatically a glass-sheet cutting line in which is integrated a form cutting machine according to the invention.

A glass sheet 1 is brought in the direction of arrow F to the cutting machine 3, through a horizontal conveyor consisting of rollers 2. The glass sheet 2 is maintained in a fixed position using an end-of-stroke contactor, not shown.

The contour 6 of the pattern to be cut out is traced on the surface of the glass sheet 1 using tracing tool 5 attached to cross-shaped tool carriage 4. Glass sheet 1 rests during the tracing on conveyor belt 7 stretched between admission rollers 8 and exit rollers 9, said conveyor belt 7 being driven by these rollers. In order for the glass sheet 1 to remain secure in one plane during the tracing of the sheet, the conveyor belt 7 is supported between rollers 8 and 9 by a support plate 10.

The cross-shaped carriage 4 is supported and moves on two carriage-support shafts 12 and 11 which extend substantially parallel to two mutually perpendicular coordinate axes denominated X and Y, the X axis extending substantially parallel to the direction of conveyance of the glass sheet 1. A Y-axis carriage-support shaft 11 is mounted at its ends on two X-axis sliders 13 and 14 which move on two X-axis guide shafts 15 and 16 extending substantially parallel to the X axis. An X-axis carriage-support shaft 12 is mounted in a similar manner on two Y-axis sliders 17 and 18 which move on Y-axis guide shafts 19 and 20 extending substantially parallel to the Y axis. Thus the direction of motion of carriage 4 parallel to the direction of conveyance of the glass sheet, i.e., parallel to arrow F, is termed in the following description the X direction. When contour 6 has been traced on glass sheet 1, conveyor belt 7 drives it towards the conveying rollers 21, which can be those of a breaking station, for example.

FIG. 2 shows a perspective view of the main guiding and driving members of the machine 3. This machine is mounted on a frame comprising four U-shaped sections from among which FIG. 2 shows two longitudinal beams 31 and 32 and a crosswise beam 33. This frame is located above a substructure which supports the conveying rollers 8 and 9 as well as their driving means (not shown) and the support plate 10. Below the longitudinal beams 31 and 32 of the frame are X-axis guide shafts 15 and 16 extending substantially parallel to the X axis. The X-axis guide shafts 15 and 16 are fixed respectively to the lower flanges of longitudinal beams 31 and 32 with interposition of spacers 35 using screws 36 (see FIG. 4).

Similarly, the Y-axis guides shafts 19 and 20 extend substantially parallel to the Y axis and are fixed to two cross-wise sections 33 of the frame with spacers placed in this case in a horizontal position against the base of the U-shaped beams 33.

The X-axis sliders 13 and 14 are slideably mounted on the guide shafts 15 and 16 respectively. similarly, the Y-axis sliders 17 and 18 are slideably mounted on the Y-axis guide shafts 19 and 20 respectively. Two X-axis toothed belt loops 37 and 38 are fixed to the X-axis sliders 13 and 14 respectively. The X-axis belts 37 and 38, as seen in FIG. 2 as regards their left portion, are looped around two cog wheels 39 and 40 mounted on a common X-direction drive shaft 41. This X-direction drive shaft 41 is linked through a coupling, not shown, to an X-direction drive motor 50. Two idler wheels (not shown) are rotatably mounted to the frame and are aligned in the Y direction and separated in the X direction from the cog wheels 39 and 40. The two X-axis belts 37 and 38 are looped around the two idler wheels. Each X-axis belt loop is maintained under tension between a cog wheel and an idler wheel.

The X-direction drive motor 50 is also mechanically coupled at an opposite end to an X-axis pulse generator 51 and to an X-axis tachometric generator 52. The X-axis drive shaft 41 thus provides for displacement along the X direction. Motor 50 is rigidly mounted on the frame of the machine.

Displacement in the Y direction is provided for similarly. A Y-axis toothed belt loop 45 is fixed to a Y axis slider 18. The Y-axis belt 45 is looped around a Y-axis cog wheel 46 mounted on a Y-axis drive shaft 47 which is coupled to a drive shaft of a Y-direction drive motor 60. At an opposite end the shaft of the Y-direction drive motor 60 is coupled to a Y-axis pulse generator 61 and a Y-axis tachometric generator 62. The Y-direction drive motor 60 is rigidly mounted on the frame of the machine. The Y-axis belt 45 is also looped around an idler wheel 46'.

A tracing head 5 is connected to a pressure-control tube 65. The pressure-control tube 65 in turn is connected by way of a support 66 attached to a longitudinal beam of the frame to a hydraulic control device, not shown in FIG. 2, which makes it possible to change the pressure exerted by the tracing tool on the glass sheet, as explained in greater detail below.

FIG. 3 shows in greater detail the structure of cross-shaped carriage 4 and of the tracing head 5. The cross-shaped carriage 4 has a first casing 70 and a second casing 71 which are perpendicular to one another and welded together at their intersection. In each of these casings 70 and 71 are mounted two ball-bearing slides designated by reference number 73 for the first casing 70. The casings are closed by the end covers 74 kept in position by screws 75. The ball-bearing slides 73 of the first casing 70 move on the X-axis carriage-support shaft 12 and those of the second casing 71 on the Y-axis carriage-support shaft 11. The tracing head 5 is fastened below the second casing 71 with screws, not shown.

The tracing head 5 comprises a cylinder 76 in which is located a piston 77. The piston 77 is urged toward a first end adjoining the second casing 71 of the interior of the cylinder 76 by a piston spring 78 bearing against a cover 79 attached to the cylinder 76 with screws 80. In the axis of the piston 77 is placed in free rotation a cutting-wheel support 81 which carries cutting wheel 82 in a fork. A nozzle 83 is provided in the cylinder 76 for connecting the pressure-control tube 65. The nozzle 83 permits the pressure-control tube 65 to communicate with a space between the piston 77 and the first end of the interior of the cylinder 76.

FIGS. 4 and 5 show respectively cross and longitudinal sections of the X-axis slider 13 supporting the Y-axis carriage-support shaft 11 on which the carriage 4 moves. The sliders 14, 17, and 18 are similarly constructed and mounted. The slider 13 has a casing 90 at each end of which there is provided a ball-bearing slide 91. The ball-bearing slides 91 are fastened to the casing 90 by two covers 92 and screws 93. The X-axis guide shaft 15 passes through the ball-bearing slides 91. Thus the X-axis slider 13 can readily be translated along the X-axis guide shaft 15. Notches are provided in the sliders 91 and the covers 92 so as to allow the passage of the spacers 35 and the screws 36 which act to fix guide shaft 15 in a direction parallel to and at a certain distance from the longitudinal U-shaped beam 31.

The ends of the X-axis toothed belt 37 are fastened to the lower part of the casing 90 by being sandwiched between a toothed rack 94 and a base plate 89 kept in place by screws 95. A bracket 96 is welded to casing 90. This bracket 90 comprises at its upper part a tubular casing 97 which supports one end of the Y-axis carriage-support shaft 11.

Figure 6:
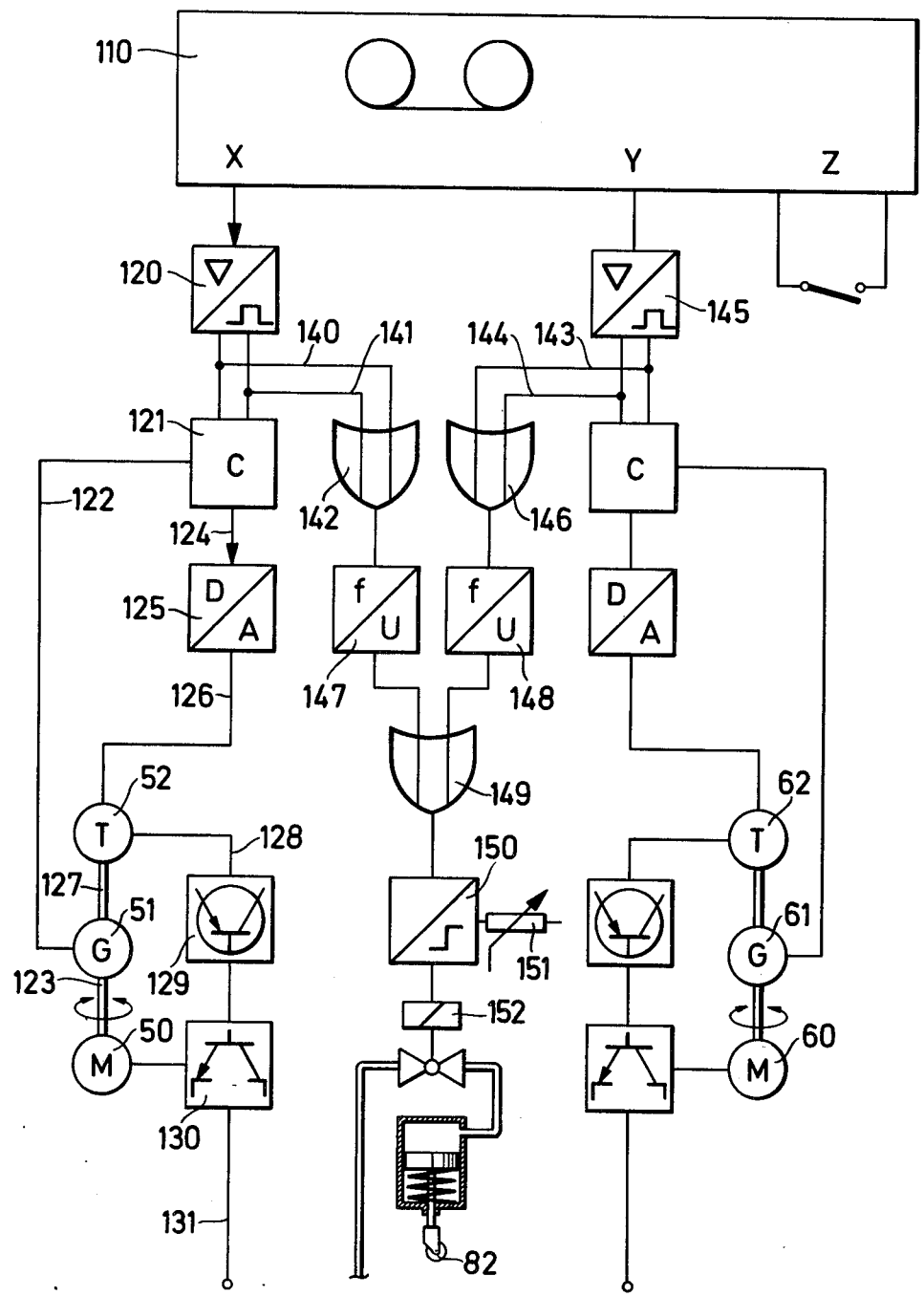
FIG. 6 shows a transistor control circuit for the drive motors as well as the pressure control of the tracing tool.

FIG. 6 shows the diagram of a transistor control circuit for the X and Y-direction drive motors 50 and 60 and for the control of the tracing pressure.

A magnetic tape unit 110 having an X-channel output and a Y-channel output is adapted to provide pulsed signals, termed position-increment pulses, for changing the position of the cross-shaped carriage 4 in increments. Such position-increment pulses need not be rectangular in shape. Thus to increment the cross-shaped carriage 4 in a forward X direction, the magnetic tape unit 110 produces a position-increment pulse of a first polarity at the X-channel output, and to increment the cross-shaped carriage 4 in a reverse X direction, a position-increment pulse of the opposite polarity is produced at the X-channel output. Similarly, to increment the cross-shaped carriage 4 in the forward and reverse Y directions, position-increment pulses of two opposite polarities are produced at the Y-channel output of the magnetic tape unit 110. A sequence of position-increment pulses at the X and Y-channel outputs of the magnetic tape unit 110 thus corresponds to incrementing the cross-shaped carriage 5 along a path over the glass sheet 1. The magnetic tape unit 110 can have an additional channel output denoted Z for supplying additional information such as the beginning and end of a tracing. A suitable magnetic tape unit 110 is described in copending application Ser. No. 841,471 filed Oct. 12, 1977.

Since the control circuit is the same for axes X and Y, the operation of the drive motor control 50 relative to the X axis will be described below by way of example.

Position-increment pulses are sent from the X-channel output of the magnetic tape unit 110 to a polarity discriminator 120 which transforms these pulses into rectangular pulses appearing at one of two output ports depending on the polarity of the position-increment pulses. A preferred polarity discriminator 120 is described in the copending application Ser. No. 841,471 cited above. The output port of the polarity discriminator 120 which corresponds to advancing the cross-shaped carriage 4 in the forward X direction is connected to a first increment input of an up/down counter 121. The output port which corresponds to moving the cross-shaped carriage 4 in the opposite direction is connected to a first decrement input of the counter 121. The counter 121 also has a second increment input which is logically "OR'ed" with the first increment input. The second increment input of the counter 121 is connected to a first output of a shaft-encoding pulse generator 51 which is mechanically coupled to the X-direction drive motor 50 by a coupling shaft 123. The shaft encoding pulse generator 120 includes a slotted diaphragm fixed to the coupling shaft, with two photoelectric cells mounted next to each other behind it. The distance between the two photoelectric cells and the dimensions of the slotted diagram are selected to cause the signals from the two photoelectric cells to have a phase shift of about 90° relative to one another. The pulses from the photoelectric cells are converted into rectangular pulses in two corresponding trigger stages. The rectangular pulses at the output of the two trigger stages are delayed with respect to one another corresponding to the phase shift. A subsequent electronic circuit now detects which of the two phase-shifted signals is the first one to appear, which indicates the direction in which the coupling shaft 123 is rotating. Signals corresponding to the two directions of rotation are separated from each other and each of them is forwarded into its proper output, with the first output carrying only the direction pulses that represent a reverse rotation and a second output only those that represent a forward rotation. The signals are detected and separated by means of a logic circuit. This type of transmitter is produced and distributed by GELMA (Gesellschaft für Elektro-Feinmechanik mbH: "Corporation for Electronic Precision Mechanics, Ltd.") under the name "Rotations-Impulsgeber" ("Rotation-pulse transmitter").

Thus the shaft-encoding pulse generator 51 produces pulses at its first output which correspond to increments of rotation of the shaft of the X-direction drive motor 50 in the direction which moves the cross-shaped carriage 4 in the reverse X direction. The second output of the shaft-encoding pulse generator 51, at which pulses appear corresponding to motion of the cross-shaped carriage 4 in the forward X-direction, is connected to a second decrement input of the up/down counter 121. The second decrement input is logically "OR'ed" with the first decrement input. The up/down counter 121 and the shaft-encoding pulse generator 51 are connected by a two-conductor cable assembly 122.

An output of the up/down counter 121 which provides the sum accumulated in the counter is linked, through a cable 124, to a digital input of a digital-to-analog converter 125, whose analog output is connected through a cable 126 to a tachometric generator 52. The tachometric generator 52, whose function is explained below, is rigidly coupled by a shaft 127 to the pulse generator 51 and the X-direction drive motor 50 by the coupling shaft 123. An example of a preferred tachometric generator is a device sold under the trade name of "Type F 12 T" by the firm "CEM" of Dijon, France.

The up/down counter 121 determines the difference in digital form between the number of pulses generated by polarity discriminator 120, taking into account whether the pulses correspond to the forward or reverse direction, and the number of pulses generated by the shaft encoding pulse generator 51, which represents changes in the angular position of the motor shaft. This difference is converted by the digital-to-analog converter 125 into a voltage error signal. The error signal originating from the digital-to-analog converter is combined with a voltage representing the angular velocity of the motor shaft originating from the tachometric generator 52. The two voltages are combined in opposition so that if the voltage from the tachometric generator and the voltage from the digital-to-analog converter 125 are equal in absolute value, the combined voltage is zero. If this is not the case, the combined voltage arises according to the absolute value and the sign of the voltages originating respectively from the digital-to-analog converter 125 and tachometric generator 51.

The combined voltage is transmitted through a conductor 128 to a motor controller 129. The motor controller 129 is commercially available and controls (through a transistor power stage 130 connected to the controller by a conductor 131) the excitation time of the X-direction drive motor 50 as a function of the magnitude and polarity of the voltage applied at its input.

A numerical example of the operation of such a circuit is given below.

The magnetic tape unit 110 sends, for example, a series of ten "forward motion" pulses from the X-channel output to the up/down counter 121. These ten pulses increment the counter ten times. The count stored in the counter 121 is made optically visible in a display device (not shown). The count stored in the counter represents a comparison of the signals originating from the X-channel output of the magnetic tape unit 110 and the shaft-encoding pulse generator 51. Thus the count which appears as a result of these ten pulses corresponds to the difference between the desired X coordinate and the actual X coordinate of the cross-shaped carriage 4. The digital count is converted by the digital-to-analog converter 125 into an analog voltage, for example, of 1 volt. This error signal of 1 volt initiates, by way of the motor controller 129 and transistor power stage 130, a forward-motion rotation of the shaft to which the X-direction drive motor 50 is coupled. As the shaft rotates, the shaft-encoding pulse generator 51 transmits "forward motion" pulses to up/down counter 121. The pulses from the shaft-encoding pulse generator are subtracted from the count stored in the counter 121 until the number zero is attained, which is displayed. The drive motor 50 then stops, since, taking signs into account, ±0 volt is obtained at the output of the digital-to-analog converter 125.

A corresponding process naturally occurs for "reverse motion" signals sent to the counter. The "reverse motion" pulses would give a negative number in the up/down counter 121 and the digital-to-analog converter 125 would provide in this case a negative voltage error signal which, in turn, would cause a reversal of the direction of rotation of the drive motor 50. The up/down counter 121, of course, also returns to zero in this case.

Pressure control of the tracing tool 5 is effected as follows. Since the quality of the cutting depends not only on the tracing speed but also on the pressure of the tool, a circuit is provided with a view to effecting optimum adjustment of this pressure. This circuit makes it possible to modify the pressure at will in a predetermined range as a function of tracing velocity.

The tracing velocity is controlled by the magnetic tape unit 110 so that linear tracings and those with a large radius of curvature will be effected at a maximum velocity, whereas tracings with a shorter radius of curvature will be effected at lower velocities. Since the curved portions to be traced are proportional to the number of pulses sent per unit time to control the driving motors for axes X and Y, this succession of pulses is used to control the pressures of the tracing tool 5.

The two outputs 140 and 141 of the signal amplifier and polarity discriminator 120 relative to the X direction, i.e., "forward motion" and "reverse motion" outputs, are connected to a first OR circuit 142. Similarly, the outputs 143 and 144 of a signal amplifier and polarity discriminator 145 for the Y direction are connected to a second OR circuit 146. These two OR circuits provide signals H (H=high) at their respective outputs when at least one of the inputs receives an H signal. H signals originating from the two polarity discriminators 120 and 145 are applied by the two OR circuits 142 and 146 to two frequency-to-voltage converters 147 and 148, respectively. The voltage at the output of a frequency-to-voltage converter corresponds approximately to the pulsing frequency of the pulses incrementing the position in the corresponding direction of the cross-shaped carriage 4, i.e., if the pulsing frequency is high, the voltage is also high and conversely. The frequency applied to the input of one of the frequency-to-voltage converters 147 or 148 is roughly proportional to the tracing velocity in the corresponding X or Y direction. Thus it is possible for a predetermined tracing velocity to trigger a signal which can be used to increase or decrease the pressure of the tracing tool 5.

The output terminals of the two frequency-to-voltage converters 147 and 148 are connected to the input terminals of a OR circuit 149, whose output is connected to a trigger 150. The threshold for transition of the trigger can be set by a potentiometer 151. The trigger 150 is connected to a relay 152 and it is possible, by adjusting the transition threshold, to set the relay operating point so that an optimum tracing pressure can be obtained for a given tracing velocity.

Because of the nature of the circuit, the highest frequency of one of the two axes will dominate. It is possible, for example, that the X-axis pulses will provide a frequency of 0 hertz and the Y-axis pulses a frequency of 1000 hertz. These 1000 hertz then provide, as a result of the value of the voltage of a corresponding magnitude, an expression of the instantaneous velocity along the Y direction and therefore of the tracing pressure which must correspond to it.

Figure 7:
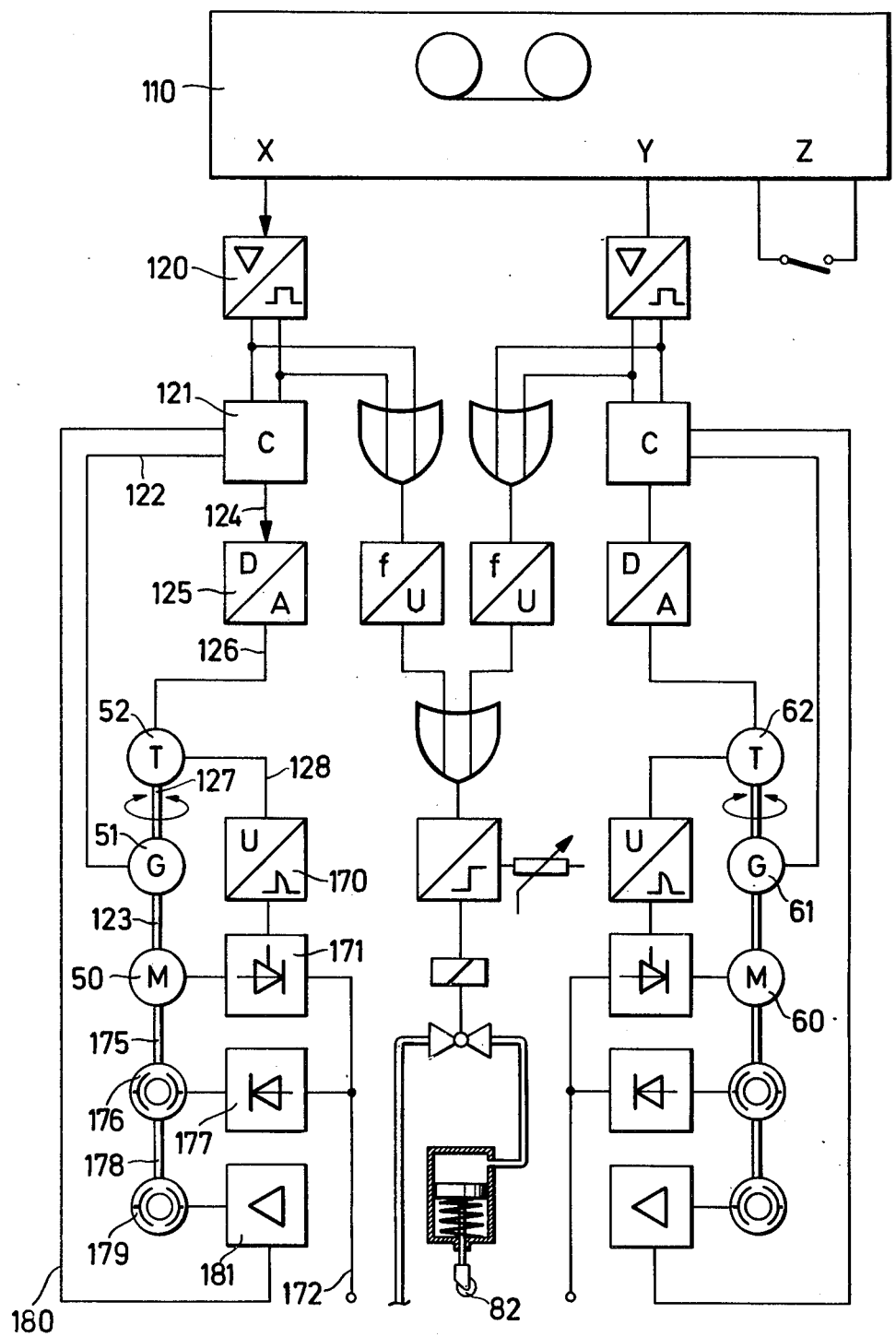
FIG. 7 shows an alternate thyristor control circuit for the drive motors as well as the pessure control for the tracing tool.

FIG. 7 shows the diagram of a thyristor control circuit for X and Y-direction drive motors 50 and 60 and for the tracing pressure control.

As described in detail above, magnetic tape unit 110 provides position increment pulses to the polarity discriminator 120, which transforms these pulses into rectangular signals which can be processed by the up/down counter 121. The up/down counter 121 is connected, on the one hand, through two-conductor cable assembly 122, to the shaft-encoding pulse generator 51 (joined to coupling shaft 123 of motor 50) and, on the other hand, through the cable 124, to the digital-to-analog converter 125. The analog output of the digital-to-analog converter 125 is linked through a cable 126 to the tachometric generator 52, which is coupled through the shaft 127 to the pulse generator 51 and through the coupling shaft 123, with motor 50. The up/down counter 121 determines the difference between the number of pulses generated by the polarity discriminator 120 (taking into account whether for forward or reverse motion) and the number of pulses sent by the shaft-encoding pulse generator 51 (again taking into account whether for forward or reverse motion), which represents changes in the angular position of the motor shaft. This digital measure of the difference is converted by the digital-to-analog converter 125 into a voltage error signal. The error signal is combined in seris with a voltage originating from the tachometric generator 52. As explained above, the voltages are combined so that if the voltages from the tachometric generator 52 and the digital-to-analog converter 125 are equal in absolute value, the combined voltage is ±0. If this is not the case, a non-zero combined voltage arises, according to the absolute value and sign of the voltage from converter 125 and the tachometric generator 52.

A cable 128 connects the output of the tachometric generator 52 to a priming and phase-shifting control unit 170. This control unit 170 is connected to a thyristor power stage 171 by a cable 172 and provides the X-direction drive motor 50 with a current pulse of a duration and polarity which are a function of the polarity and magnitude of the signal applied to the input of the control unit 170.

In order to avoid the motor hunting phenomenon at high velocities, the X-direction drive motor 50 is coupled, by a shaft 175, to an induction brake 176. A constant voltage, which is adjusted so that even for the largest accelerations and decelerations of the drive motor 50 there will be substantially no delay or overshoot in the response, is applied to this brake from the network power source through conductor 172 and rectifier 177. Since the force of the induction brake is proportional to the number of revolutions per unit time of the motor, substantially no braking force is obtained when the drive motor 50 is shut off. In order to avoid this unstable eqilibrium, the motor is also coupled, through a shaft 178, with an electromagnetic brake 179 which is excited, through a conductor 180 and an amplifier 181, by the up/down counter 121 when a zero difference appears between the number of pulses provided by polarity discriminator 120 and the number of pulses provided by shaft-encoding pulse generator 51.

The tracing pressure control is provided as described with regard to FIG. 6.

Figure 8:
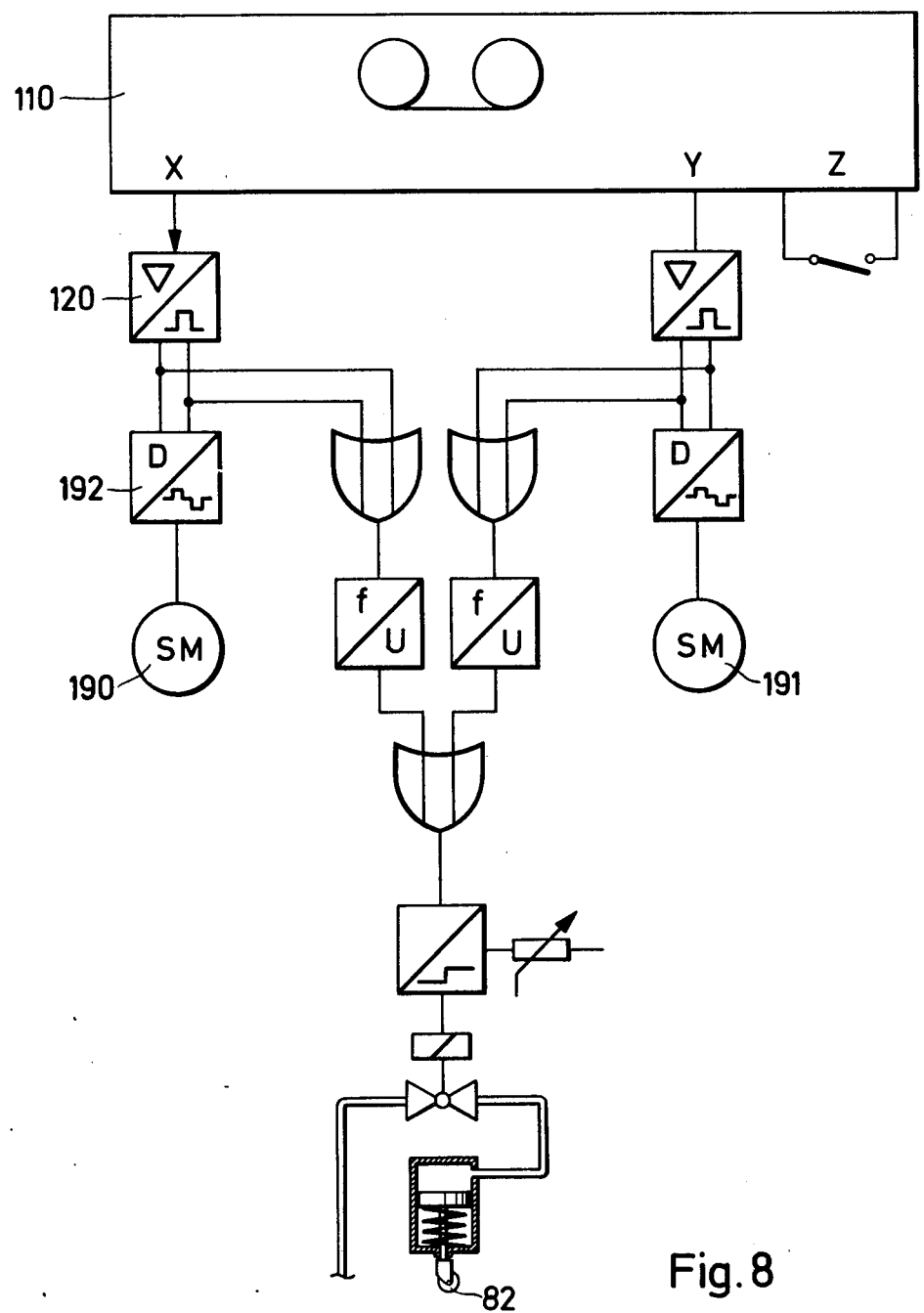
FIG. 8 shows an electrohydraulic control circuit for the drive motors as well as the pressure control for the tracing tool.

FIG. 8 shows the diagram of an electrohydraulic control circuit for the driving motors for the X and Y directions and for the tracing pressure control.

The magnetic tape unit 110 sends information to two stepping motors 190 and 191 provided for motion in the X and Y directions respectively. As noted above in connection with FIG. 6, the magnetic tape unit 110 can also provide additional information regarding, for example, the beginning and end of a tracing operation, to various control elements.

Since the control circuit is the same for X and Y axes, the way in which control is effected for axis X will be described below.

The components used in this control circuit are commercially available and thus will not be described in detail.

The magnetic tape unit 110 sends position increment pulses to the polarity discriminator 120 which are transformed into rectangular pulses. The latter pulses are sent to a piloting unit 192 (for example, of the "SIEMENS" type) which transforms them into drive pulses which can be used by a stepping electrohydraulic motor 190, made also by "SIEMENS."

This type of electrohydraulic control can be used for tracing velocities which are not too high.

We claim:

1. A form-cutting machine for cutting a form in a flat surface of a sheet of material in response to a numerical control signal, the shape of the form being determined by the numerical control signal, the form-cutting machine comprising:
   (a) a frame having an X-axis direction, a Y-axis direction, a tracing plane, a first carriage-locus plane, and a second carriage-locus plane defined in relation thereto, the X-axis and the Y-axis directions being substantially mutually perpendicular and located in the tracing plane, the three planes being spaced apart from and substantially parallel to one another;
   (b) sheet-support means for supporting the sheet of material such that the surface to be cut substantially coincides with the tracing plane;
   (c) an X-direction carriage-positioning assembly, having:
      (c.1) a Y-axis carriage support member located in the first carriage-locus plane and extending linearly in the Y-axis direction;
      (c.2) a first X-axis guide member and a second X-axis guide member, the two guide members being fixedly attached to the frame spaced apart from one another and extending linearly substantially parallel to the X-axis direction;
      (c.3) a first X-axis slider and a second X-axis slider slideably mounted on the first and the second X-axis guide members respectively, the first X-axis slider being attached to a first end of the Y-axis carriage support member and the second X-axis slider being attached to a second end of the Y-axis carriage support member;
      (c.4) an X-direction drive motor for moving the Y-axis carriage support member, the X-direction drive motor being fixedly secured to the frame;
      (c.5) X-axis toothed-belt means for connecting the X-direction drive motor and the Y-axis carriage support member so that motion produced by the motor is imparted to the support member with substantially no slippage;
   (d) a Y-direction carriage-positioning assembly, having:
      (d.1) an X-axis carriage support member located in the second carriage-locus plane and extending linearly in the X-axis direction;
      (d.2) a first Y-axis guide member and a second Y-axis guide member, the two guide members being fixedly attached to the frame spaced apart from one another and extending linearly substantially parallel to the Y-axis direction;
      (d.3) a first Y-axis slider and a second Y-axis slider slideably mounted on the first and the second Y-axis guide members respectively, the first Y-axis slider being attached to a first end of the X-axis carriage support member and the second Y-axis slider being attached to a second end of the X-axis carriage support member;
      (d.4) a Y-direction drive motor for moving the X-axis carriage support member, the Y-direction drive motor being fixedly secured to the frame;
      (d.5) Y-axis toothed-belt means for connecting the Y-direction drive motor and the X-axis carriage support member so that motion produced by the motor is imparted to the support member with substantially no slippage;
   (e) a tool carriage having a cutting tool mounted thereon so that the cutting tool can be positioned in the tracing plane, the tool carriage being slideably mounted on the X-axis carriage support member and on the Y-axis carriage support member such that moving the carriage support members causes the cutting tool to move parallel to the tracing plane; and
   (f) circuit means connected to the X-direction and Y-direction drive motors for energizing the drive motors so that the Y-axis and the X-axis carriage support members, and consequently the tool carriage, are positioned in response to the numerical control signal.

2. The apparatus according to claim 1 in which the cutting tool is adapted to cut sheets of glass.

3. The apparatus according to claim 2 in which the X-axis and Y-axis carriage support members are cylindrical shafts and in which the tool carriage is fitted with ball-bearing slides adapted to mate slideably with the carriage support members.

4. The apparatus according to claim 3 in which the X-axis toothed-belt means includes:
  (c.5.1) an X-direction drive shaft rotatably mounted on the frame and coupled to the shaft of the X-direction drive motor, the X-direction drive shaft extending linearly substantially parallel to the Y-axis;
  (c.5.2) a first cog wheel and a second cog wheel mounted on the X-direction drive shaft, the two cog wheels being separated in the Y direction;
  (c.5.3) a first idler wheel and a second idler wheel rotatably mounted to the frame, the first and the second idler wheels being aligned in the Y-direction and separated in the X-direction from the first and the second cog wheels, respectively;
  (c.5.4) a first X-axis toothed belt loop and a second X-axis toothed belt loop, the first X-axis toothed belt loop being looped around and maintained under tension between the first cog wheel and the first idler wheel, the second X-axis toothed belt loop being looped around and maintained under tension between the second cog wheel and the second idler wheel;
  (c.5.5) means for connecting the first X-axis slider to the first X-axis toothed belt loop; and
  (c.5.6) means for connecting the second X-axis slider to the second X-axis toothed belt loop; and
the Y-axis toothed-belt means includes:
  (d.5.1) a Y-direction drive shaft rotatably mounted on the frame and coupled to the shaft of the Y-direction drive motor, the Y-direction drive shaft extending linearly substantially parallel to the X axis;
  (d.5.2) a first cog wheel and a second cog wheel mounted on the Y-direction drive shaft, the two cog wheels being separated in the Y direction;
  (d.5.3) a first idler wheel and a second idler wheel rotatably mounted to the frame, the first and the second idler wheels being aligned in the X-direction and separated in the Y-direction from the first and the second cog wheels, respectively;
  (d.5.4) a first Y-axis toothed belt loop and a second Y-axis toothed belt loop, the first Y-axis toothed belt loop being looped around and maintained under tension between the first cog wheel and the first idler wheel, the second Y-axis toothed belt loop being looped around and maintained under tension between the second cog wheel and the second idler wheel;
  (d.5.5) means for connecting the first Y-axis slider to the first Y-axis toothed belt loop; and
  (d.5.6) means for connecting the second Y-axis slider to the second Y-axis toothed belt loop.

5. The apparatus according to claim 4 further comprising:
  (g) cutting-pressure-adjustment means for varying the pressure exerted by the cutting tool on the surface to be cut.

6. The apparatus according to claim 5 in which the cutting-pressure-adjustment means includes a control system for automatically varying the pressure exerted by the cutting tool in response to changes in the velocity of the tool carriage.

7. The apparatus according to claim 1 in which the circuit means for energizing the drive motors includes an X-direction drive motor power cable and a Y-direction drive motor power cable connected to the X-direction and the Y-direction drive motors respectively, for connecting the drive motors to external power sources.

8. The apparatus according to claim 1 in which the circuit means for energizing the drive motors includes a thyristor circuit.

9. The apparatus according to claim 1 in which the circuit means for energizing the drive motors includes a transistor circuit.

10. The apparatus according to claim 1 in which the circuit means for energizing the drive motors includes an electrohydraulic control system.

* * * * *

UNITED STATES PATENT AND TRADEMARK OFFICE
CERTIFICATE OF CORRECTION

PATENT NO. : 4,171,657
DATED : October 23, 1979
INVENTOR(S) : Friedrich Halberschmidt et al.

It is certified that error appears in the above-identified patent and that said Letters Patent are hereby corrected as shown below:

Column 2, line 7, "80 m//min" should be -- 80 m/min --;

Column 2, line 26, delete -- changed. --;

Column 2, line 34, "charged" should be -- changed --;

Column 2, lines 53 and 54, delete -- and through the cross-shaped carriage --;

Column 3, line 54, "guides shafts" should be -- guide shafts --;

Column 8, line 56, "seris" should be -- series --;

Column 9, line 17, "eqilibrium" should be -- equilibrium --

Signed and Sealed this

Twenty-ninth Day of January 1980

[SEAL]

Attest:

SIDNEY A. DIAMOND

Attesting Officer

Commissioner of Patents and Trademarks